United States Patent [19]
Oades

[11] Patent Number: 5,890,400
[45] Date of Patent: Apr. 6, 1999

[54] APPARATUS FOR GENERATING A PROPULSION FORCE

[76] Inventor: Ross A. Oades, 310-41 Clayton Drive, Winnipeg, Manitoba, Canada, R2M-1C3

[21] Appl. No.: 841,721

[22] Filed: Apr. 30, 1997

Related U.S. Application Data

[60] Provisional application No. 60/019,910 Jun. 14, 1996 and provisional application No. 60/034,640 Jan. 3, 1997.

[51] Int. Cl.$^6$ .............................. F16H 27/04; G05G 1/00
[52] U.S. Cl. .............................. 74/845; 74/84 R; 74/571; 74/572
[58] Field of Search ..................... 74/845, 84 R, 74/120, 117, 119, 52, 53, 61, 14, 571, 572; 475/255, 162, 169, 170

[56] References Cited

U.S. PATENT DOCUMENTS

| | | | |
|---|---|---|---|
| 3,968,700 | 7/1976 | Cuff | 74/84 S |
| 4,186,613 | 2/1980 | Carlson, Jr. | 74/52 |
| 4,788,882 | 12/1988 | Fulop | 74/84 S |
| 5,167,163 | 12/1992 | McMahan | 74/84 S |
| 5,488,877 | 2/1996 | Lieurance | 74/84 R |

Primary Examiner—Charles A. Marmor
Assistant Examiner—Marcus Charles
Attorney, Agent, or Firm—Adrian D. Battison; Murray E. Thrift

[57] ABSTRACT

There is provided an apparatus for developing a propulsion force in a predetermined direction. The apparatus includes an outer frame and an inner frame slidably mounted within the outer frame. The inner frame supports a flywheel which rotates about a shaft defining a first axis. Masses are mounted to the flywheel for rotational movement with the flywheel and for lateral movement relative to the flywheel in a direction to increase and decrease a distance of a center of gravity of the masses from the first axis. The outer frame supports a mass movement control member rotating with the flywheel about a second axis parallel to the first axis. The control member moves the masses cyclically such that the distance from the first axis is at a maximum in the direction of propulsion and at a minimum in a direction opposite to the direction of propulsion. A directional control controls the displacement of the outer frame in relation to the inner frame for controlling magnitude and direction of the propulsion force by adjusting the amount of offset between the first and second axes.

7 Claims, 12 Drawing Sheets

APPARATUS FOR GENERATING A PROPULSION FORCE

This application claims the benefit under 35USC119 of the filing date of Provisional Applications Ser. Nos. 60/019,910 filed Jun. 14th 1996 and 60/034,640 filed Jan. 3rd 1997.

FIELD OF THE INVENTION

This invention relates to an apparatus for developing a propulsion force in a-predetermined, direction.

SUMMARY OF THE INVENTION

It one object of the. present invention to provide an Improved device of this general type.

According to one aspect of the invention there Is provided an apparatus for developing a propulsion force, in a predetermined direction comprising:

a first and a second mass;

a flywheel;

means mounting the flywheel for rotation about a first axis extending through a centre of the flywheel, the flywheel being arranged such that the direction lies at right angles to the first axis along a diameter of the flywheel;

the first mass and the second mass being mounted on the flywheel for rotational movement therewith about the first axis;

a second mass mounted on the second gear wheel for pivotal movement relative thereto about a second pivot axis parallel to the respective gear wheel axis and for lateral movement relative to the flywheel in a direction to increase and decrease a distance of a center of gravity of the mass from the first axis;

and a mass movement control member for controlling movement of the masses as they rotate with the flywheel such that the masses are cyclically moved relative to the flywheel such that the spacing from the first axis is at a maximum in said direction and at a minimum in a direction opposite to said direction.

Preferably the, control member rotates about a second axis offset from the first axis, in said direction.

Preferably the apparatus is arranged:

wherein the flywheel includes a first gear wheel and a second gear wheel, each of which Is mounted on the flywheel for rotation therewith about the axis;

wherein there is provided a stationary gear member mounted on the axis of the flywheel and defining a peripheral surface of the gear surrounding the axis;

wherein each of the first and second gear wheels has a peripheral surface receiving rotational drive from the stationary gear;

wherein each of the first and second gear wheels is mounted on the typewheel for rotation about a respective gear wheel axis parallel to the flywheel axis, the gear wheel axis being arranged on a common line with the flywheel axis said line lying in said direction such that rotation of the flywheel about the. flywheel axis causes rotation of each gear wheel about its own axis on the flywheel and causes rotation of the gear wheel axes about the flywheel axis;

wherein the first mass is mounted on the first gear wheel for pivotal movement relative thereto about a first pivot axis parallel to the respective gear wheel axis and the second mass is mounted on the second gear wheel for pivotal movement relative thereto about a second pivot axis parallel to the respective gear wheel axis;

and wherein the pivot axes of the first and second masses are offset relative to the respective gear wheel axis in said direction such that the pivot axis of the first mass lies on the common line spaced inwardly toward the flywheel axis and the pivot axis of the second mass lies on the common line spaced outwardly from the second gear wheel axis away from the flywheel axis.

Preferably the control member comprises a first control rod member and a second control rod member, each of the control rod members having a first end pivotally mounted at a position fixed relative to said stationary gear and an outer end connected to a respective one of the first and second masses.

Preferably each of the rod members Is pivotally connected to the respective one of the first and second masses.

Preferably the pivot point of the rod member on the respective mass is fixed such that the position of the mass is defined by the position of the pivot point of the mass on the respected gear wheel and the position of the pivot point of the lever on the respective mass.

Preferably the inner end of each of the rod members is offset relative to the flywheel axis by a distance equal to the spacing between the pivot point of the rod member on the mass and the pivot axis of the mass.

Preferably the rod members each have the inner end thereof pivotal about the same point.

Preferably the rod members are spring biased toward the maximum and minimum positions.

Preferably the rod members are mounted on a mounting member which rotates with the rod members about the second axis and wherein the rod members are spring biased by a pair of springs mounted on the mounting member and arranged on opposed sides of the rod members to press against sides of the rod members.

Preferably the control member includes springs biasing the masses to the maximum and minimum positions.

Preferably the control member comprises a disk parallel to the flywheel with slots therein for guiding the masses.

Preferably the disk includes springs mounted in the slots for biasing the masses toward the maximum and minimum positions.

Preferably the apparatus is arranged:

wherein the flywheel includes a first and a second elongate slot shaped opening in the flywheel extending radially outwards from a centre of the flywheel;

wherein the first and second masses are slidably arranged within respective ones of the slot shaped opening for movement therein;

wherein the control member is arranged generally parallel to and adjacent to the flywheel and is mounted for rotation about a second axis parallel to and offset from the first axis in the direction;

and wherein the control member includes a first and a second guide slot therein each for cooperating with the respective mass, the guide slot extending in a direction which is lies on a circle surrounding the second axis.

Preferably the control member comprises a disk having an annular bearing containing the first axis.

Preferably the control member comprises a pair of parallel disks, each on a respective side of the flywheel with the slots of one disk aligned with the slots of the other.

Preferably each mass is dumbbell-shaped with a shaft extending through the aligned slots of the disks.

One embodiment of the invention will now be described in conjunction with the accompanying drawings in which:

BRIEF DESCRIPTION OF THE DRAWINGS

FIG. 12 is a bottom view of the embodiment of FIG. 9 in the drawings like characters of reference indicate corresponding parts in the different figures.

DETAILED DESCRIPTION

The first embodiment shown in FIGS. 1 to 7 comprises a weight support wheel 10 in the form of a .flat circular disc which is rotatable about a central vertical axis 1I1 of the weight support. wheel driven by a motor M. The motor M is fixed to a shaft carrying a stationary circular gear 12 having a peripheral surface 13 surrounding the axis 11. The motor, the shaft and the stationary gear are held in fixed position by attachment to a suitable housing (not shown). The shape of the weight support wheel is of little importance and can be varied, provided that the weight support wheel is balanced for rotation about the axis 11.

The weight support wheel 10 carries a first pivot pin 14 and a second pivot pin 15 with those pivot pins lying on a common line 16 passing through the axis 11 so that the pivot pin 14 is. on one side of the axis 11 and the pivot pin 15 is on the opposite side of the axis 11 with both pivot pins equi distantly spaced from the axis 11. On the pivot pin 14 is mounted a circular first gear 17 and. on the second pivot pin 15 is mounted a second circular gear 18. The gears each have a peripheral surface in meshing engagement with the outside surface 13 of the fixed gear 12.

Figure 1:
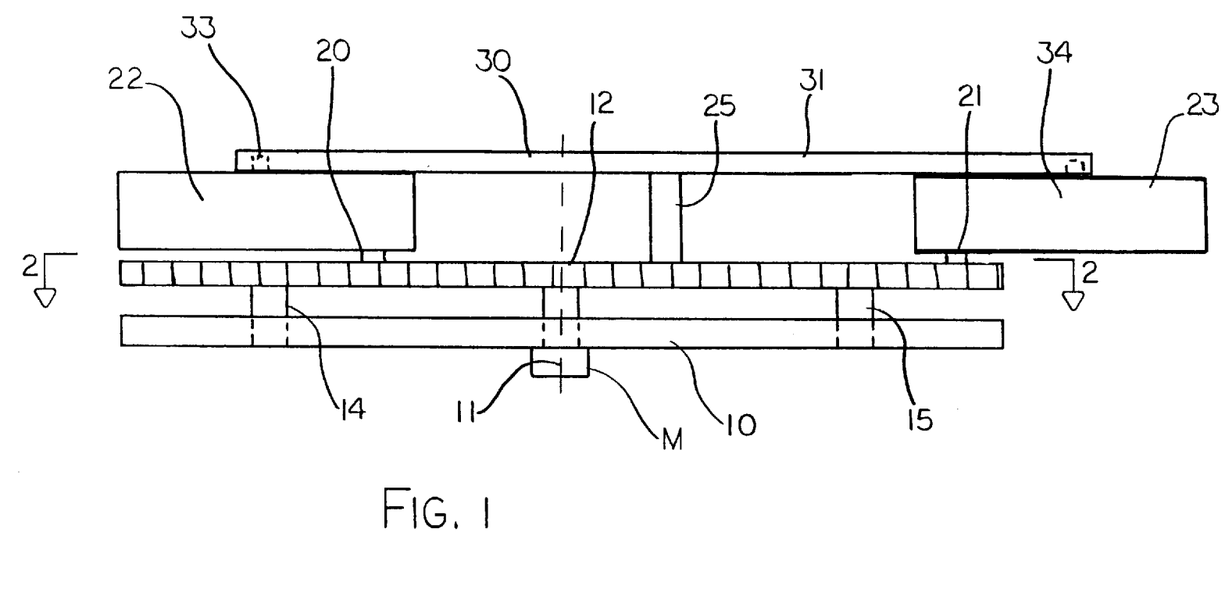
FIG. 1 is a side elevational view of a first embodiment of an apparatus according to the present invention.
Figure 2:
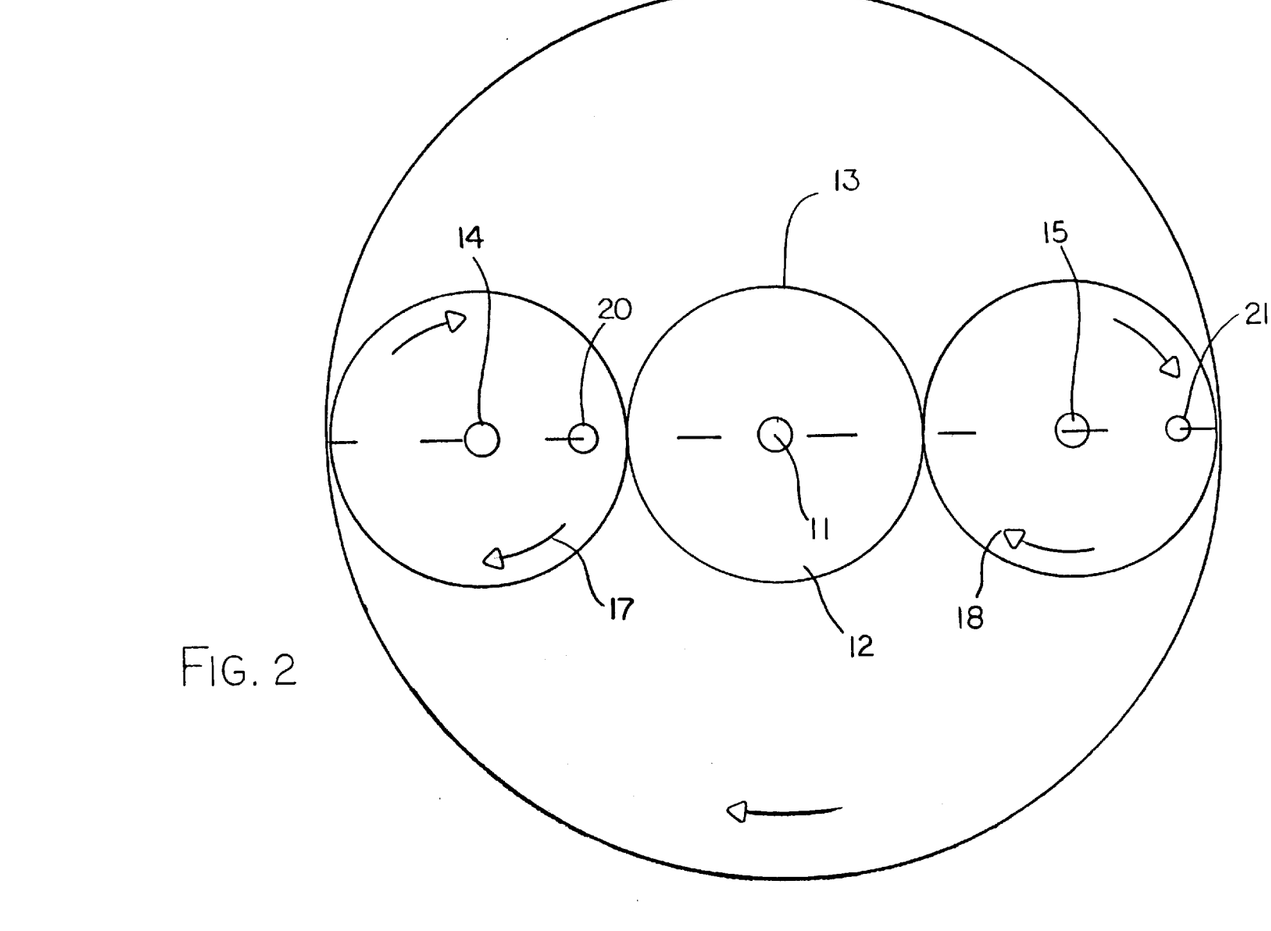
FIG. 2 is a cross sectional view along the lines 2—2 of FIG. 1.

Thus rotation of the weight support wheel about the axis 11 causes the pivot axles 14 and 15 to rotate with the weight support wheel about the axis 11. At the same time the intermeshing engagement between the gears 13 and 17 and the gears 13 and 18 causes rotation of each of the gears 17 and 18 about its pivot axle 14, 15. The arrangement is such that a rotation of the weight support wheel through 180° causes each of the gears 17 and 18 to rotate through 360°. in this way the device is symmetrical in that, as shown in FIG. 2, as the weight support wheel rotates in a clockwise direction through 180°, the gear 17 rotates to take up exactly the position of the gear 18 and similar to the gear 18 rotates to take up the position of the gear 17.

The gear 17 carries an offset axle 20 and the gear 18 carries an offset axle 21. These axles are parallel to the axles 14, 15, and to the centre axis 11. The offset axles are arranged to lie on the common line 16 and are equi distantly spaced from the respective centre axle and on the same side of that centre side of that centre axle as shown in FIG. 2.

The offset axles 20 carries a first pendulum mass 22 and the offset axle 21 carries a second pendulum mass 23. Each pendulum mass is rotatable about the respective offset axle. in the embodiment shown the pendulum masses 22 and 23 are shaped as a flat circular disc of the same diameter as the respective gear 17, 18. However the pendulum masses can be of different shape provided that they are symmetrical so that the structure is balanced.

The stationary gear 12 carries a pivot pin 25 standing vertically upwardly from the stationary gear at a position offset to one side of the vertical axis 11. The axle 25 lies on the same common line 16. The spacing between the axle 25 and the axis 11 is equal to the spacing between the offset axle 20 and the offset axle 14 and also equal to the spacing between the offset axle 21 and the centre axle 15.

Figure 3:
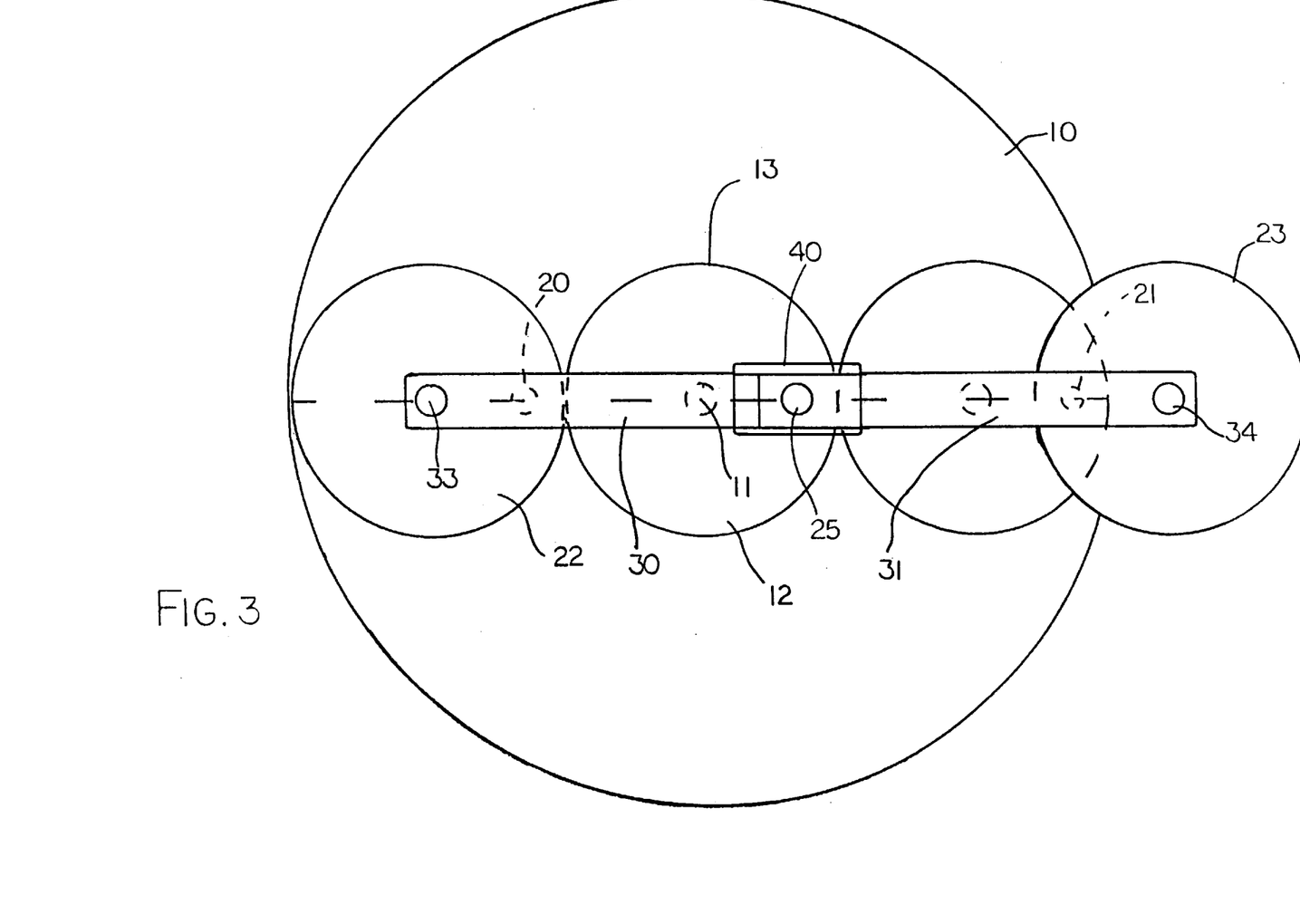
FIG. 3 is a top plan view of the apparatus of FIG. 1

The axle 25 carries a pair of levers or connecting rods 30 and 31 each of which is rotatable about the axle 25 in a plane parallel to the weight support wheel. Each lever or connecting rod extends from an inner end at the axle 25 to a respective outer end which carries a respective one of a pair of connecting pins 33 and 34. The connecting pin 33 extends from the outer end of the lever 30 to a position on the mass 22. The length of the levers is arranged such that the pin 33 overlies the axle 14 when the masses are in the left hand position as shown in FIG. 3.

Figure 4:
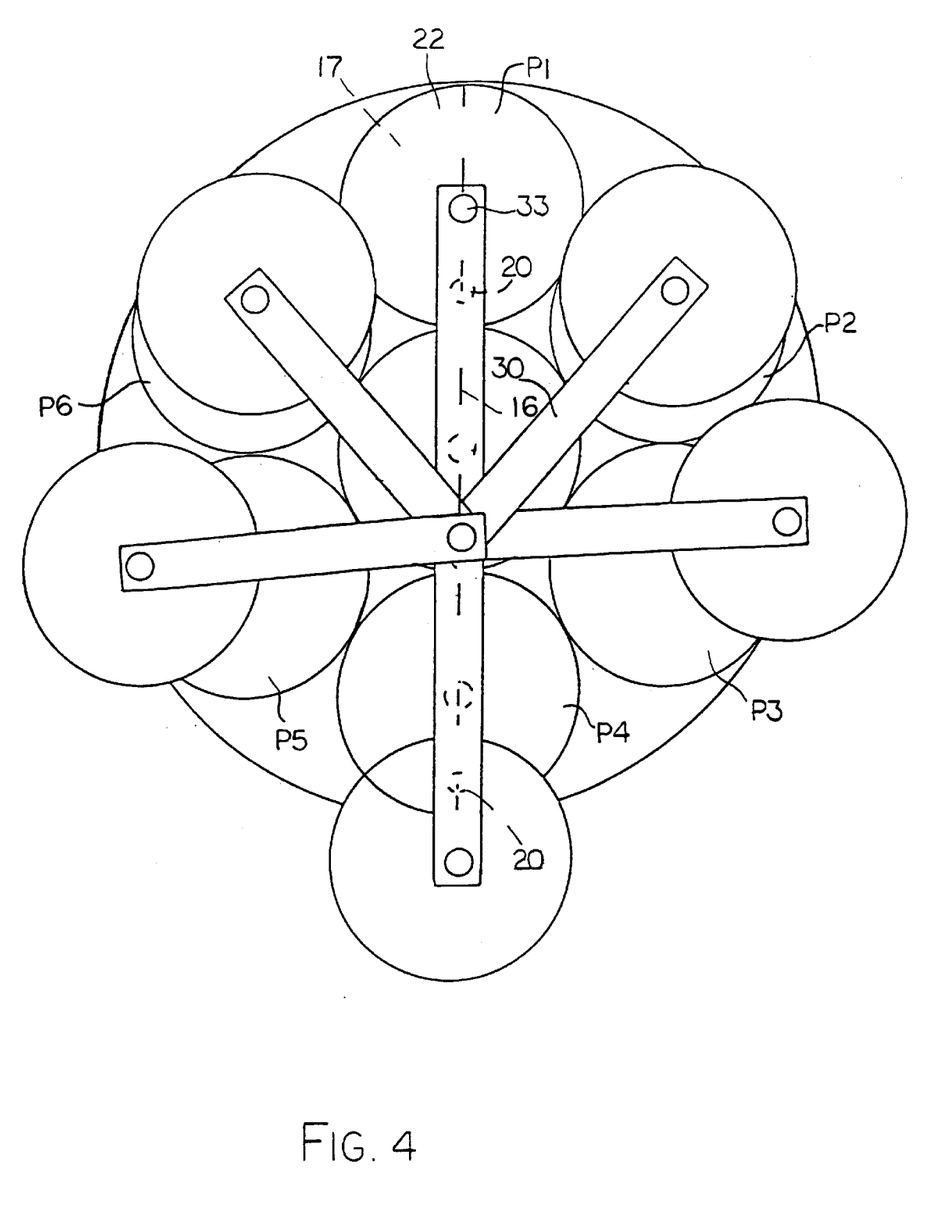
FIG. 4 is a top plan view similar to that of FIG. 3 showing a number, of positions of the apparatus during rotation of the weight support wheel.

In FIG. 4 is shown a series of positions of the gear 17 and the mass 22 as the weight support wheel rotates through 360°. it will be appreciated that the movement of the gear 18 and the mass 23 is exactly symmetrical but a 180° out of phase. Thus the gear 17 moves through a series of positions, in which six of those positions are indicated at P1 through P6.

The cooperation between the pivot pin 33 of the lever 30 and the offset axle 20 of the gear 17 controls the position of the mass as it moves between the six positions P1 through P6. It will be noted therefore that the mass 22 is. directly overlying the gear. 17 in the position P1 but that the mass 22 stands outwardly from the gear 17 in the position P4 which is directly opposite to the position P1.

This unbalanced movement of the mass causes the. generation of a thrust along the lines 16 in the direction of position of P4. A change in this direction can be obtained by twisting the stationary gear so that the axle or pin 25 is moved to one side or the other of the line 16.

The mass 22 and the mass 23 can be of any preferred shape provided that the mass connects with the pin 33 and the axle 20.

The number of gears and associated pendulum masses can be different from the two as shown. The number can be increased to at least four and more provided there is sufficient room for them to be located as described.

The stationary gear may communicate drive to the gears by a timing belt or similar arrangement in a situation where there is space between the outside surfaces.

Figure 5:
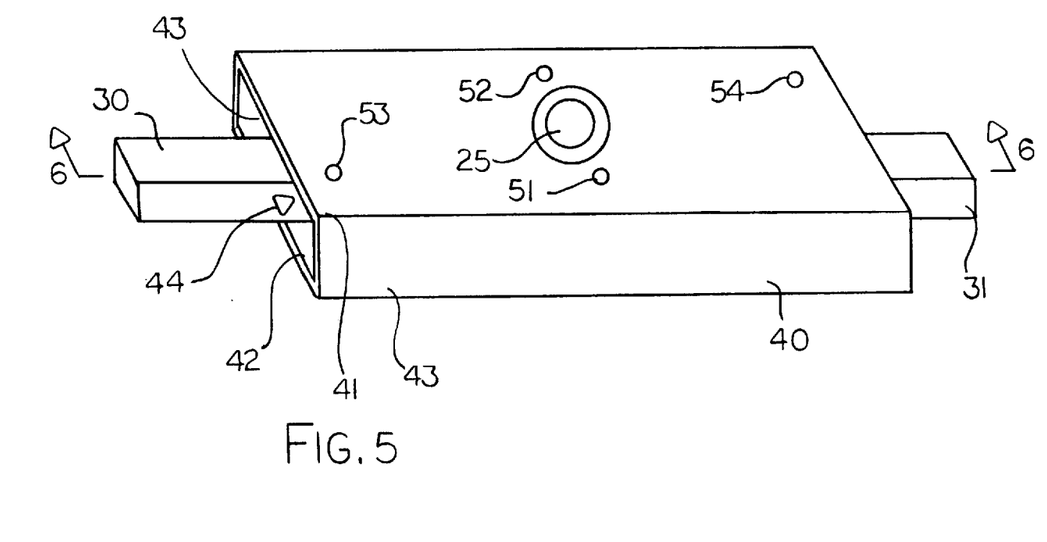
FIG. 5 is an isometric view showing a mounting support for the control rods of the embodiment of FIGS. 1 through 4.
Figure 6:
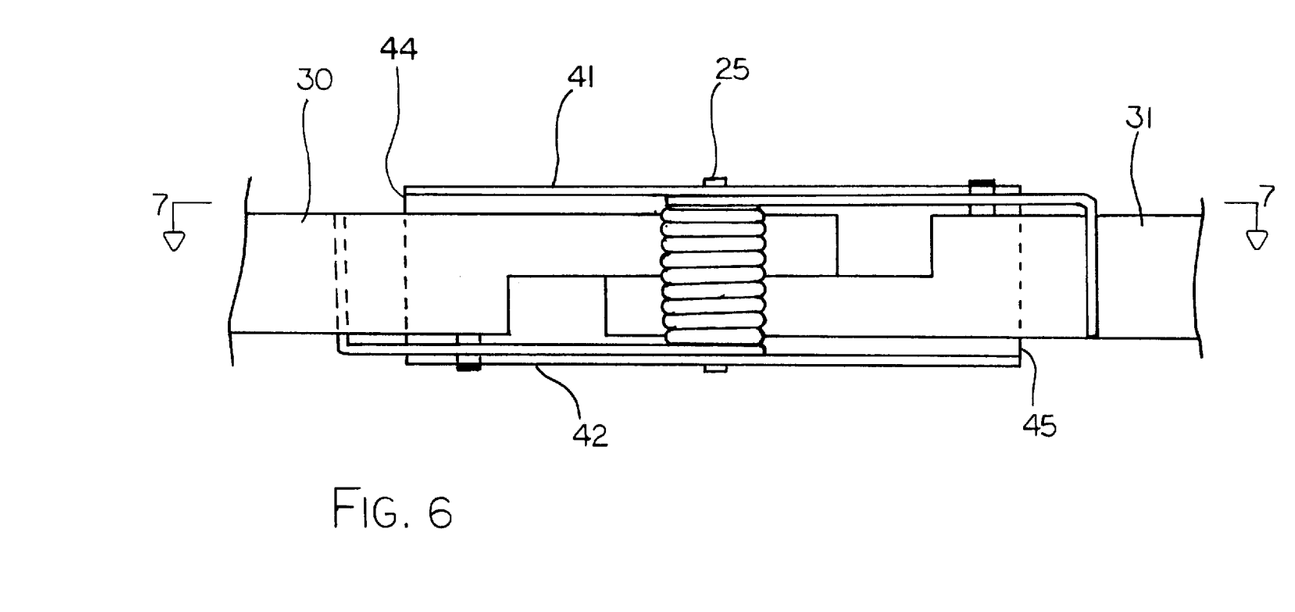
FIG. 6 is a cross sectional view along the lines 6—6 of FIG. 5.

In FIGS. 5, 6 and. 7 is shown an addition to the embodiment of FIGS. 1 through 4 in which there is provided a mounting member 40 carried on the axle 25 for the control rods 30 and 31. The mounting member 40 comprises a tubular container having parallel top and bottom walls 41, 42 and side walls 43 which are connected to form open ends 44 and 45. The arms 30 and 3.1 are mounted within the tubular body so as to pass above the bottom wall 42 and below the top wall 41. The arms are thus free to pivot on the axle 25 within the tubular body of the mounting member 40 with the range of movement confined by the side walls at the respective open mouth. Each arm thus projects through respective one of the open ends 44, 45.

Figure 7:
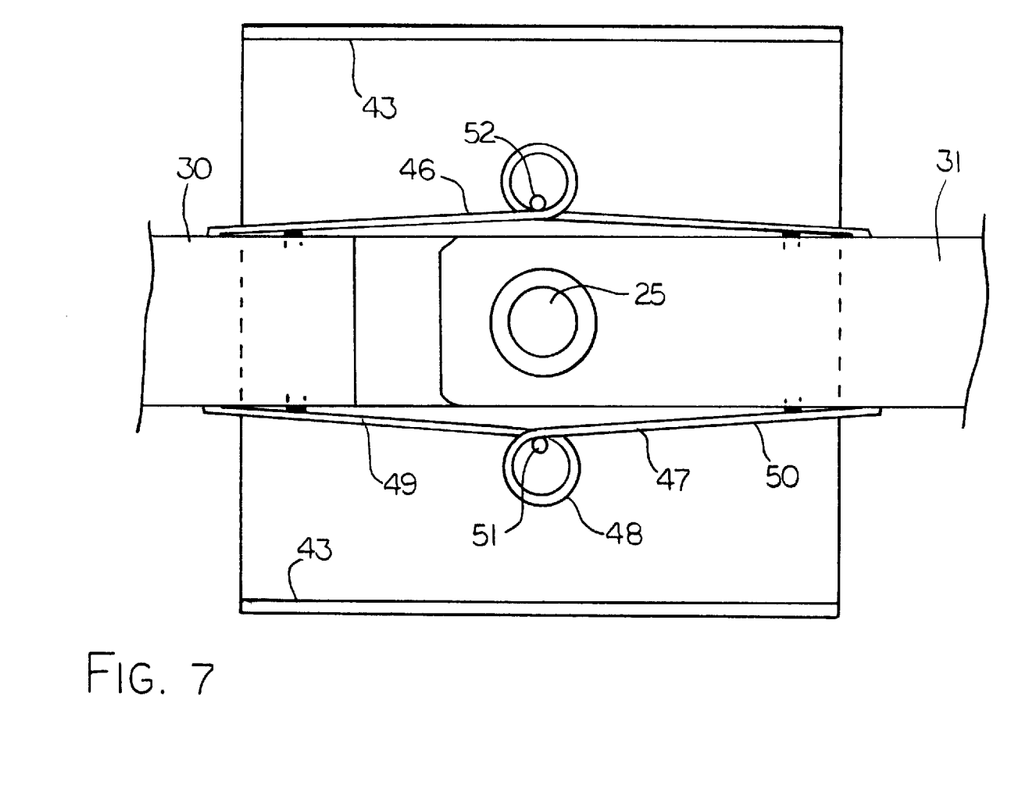
FIG. 7 is a cross sectional view along the lines 7—7 of FIG. 6.

The arms are biased toward a position in which they: are parallel to the side walls 43 by a pair of springs 46 and 47. Each spring comprises a coil portion 48 and a pair of arms 49, 50. The coil spring, portion stands vertically alongside the arms parallel to the axle 25. The arms include horizontal portions which lie generally alongside of the respective rod and a vertical portion for ongaging the rod and applying a spring biasing force to the rod. The springs are held in place by pins 51 and 52 which extend through the tubular member. Cradle stops 53 and 54 act to locate the springs thus tending to hold the control rods in the preferred position parallel to the sides 43 of the support member. The support member is free to rotate on the axle 25 with the control rods.

The construction thus defined allows the rods to pivot relative to the support member but to spring bias the rods so that they take up the position preferentially which is shown in the figures in which the masses are held in the maximum and minimum displacement positions.

Figure 8:
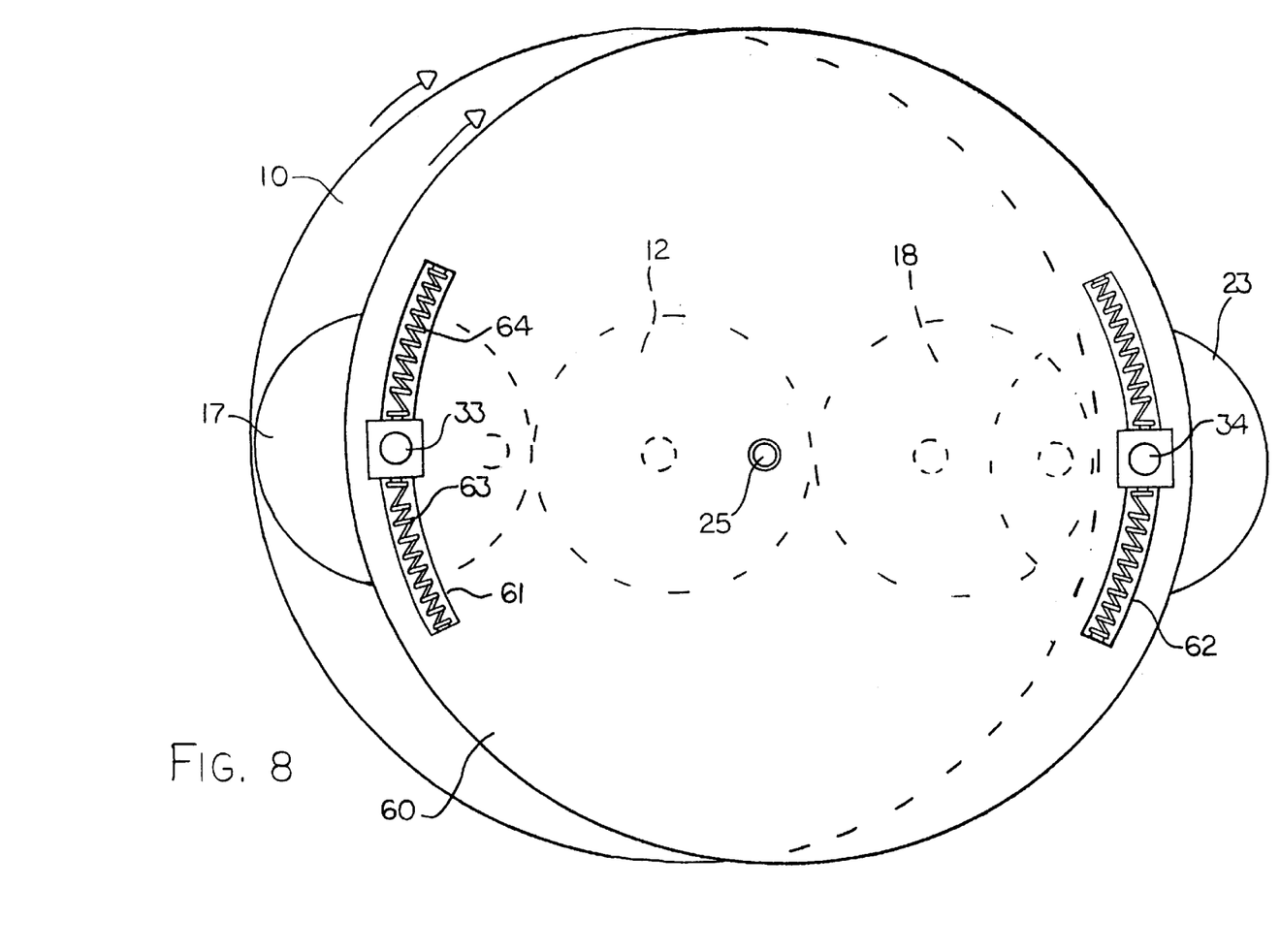
FIG. 8 is a front elevational view of a second embodiment similar to that of FIGS. 1 through 7 including a modified control device.

In FIG. 8 is shown a second embodiment similar to that of FIGS. 1 through 7 which includes the fly wheel 10, the stationary gear 12, at he gears 17 and 18 and the masses 22 and 23.

In place of the rods 30 and 31 is provided a control disc 60 which generally overlies the fly wheel and is parallel thereto. The disc 60 is rotatable about the shaft 25. The disc 60 carries a pair of slots 61 and 62 each receiving the axle 33, 34 of the masses 22 and 23. The axle is biased into a central position by a pair of springs 63 and 64 in each of the respective slots thus allowing the mass to take up the position as previously described in regard to the previous embodiment while biasing the masses to the maximum minimum displacement positions as shown.

The springs act in opposition to one another so that one is compressed while the other expands so the energy lost in the springs is limited.

Turning now to the further embodiment shown in FIGS. 9 through 12, which has some differences relative to the embodiments shown in FIGS. 1 to 8, this includes a flywheel 70 rotatable about an axle 71 driven by a pulley 72 from a power source (not shown). The fly wheel 70 comprises a flat disc at right angles to the axis of the shaft 71 with a plurality of radially extending slots 73 extending from a position adjacent the periphery of the disc inwardly of the periphery toward the shaft 71 to a position spaced outwardly from the shaft by a distance approximately equal to one half of the distance between the shaft and the periphery.

Figure 9:
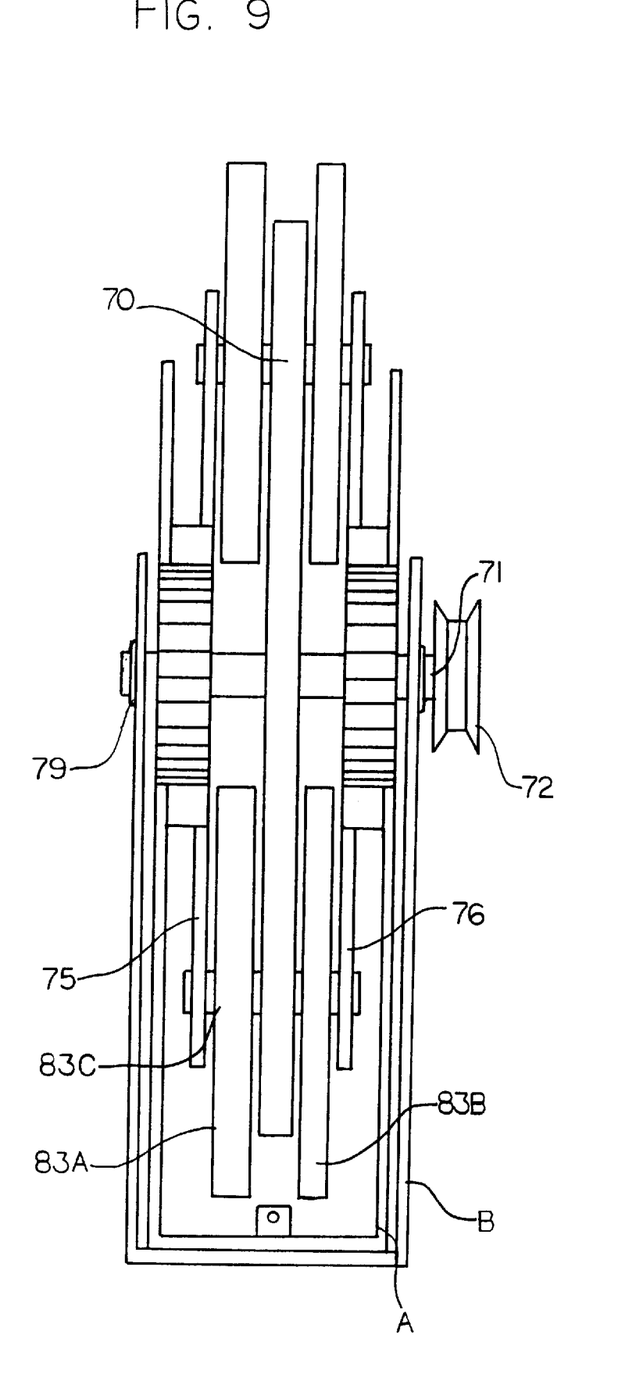
FIG. 9 is an end elevational view of a further embodiment of the device according to the present invention.
Figure 10:
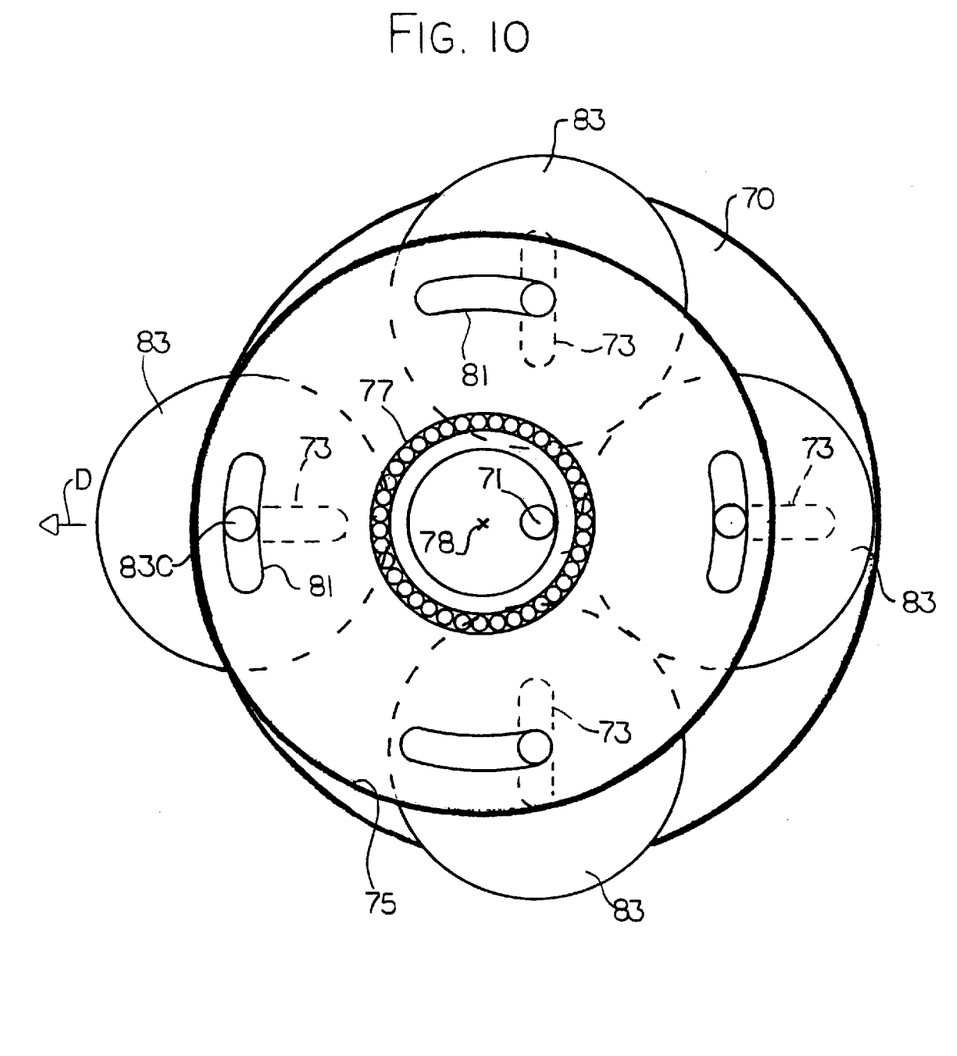
FIG. 10 is a front elevational view of the embodiment of FIG. 9 with the housing removed.

The apparatus further includes a pair of mass control guide wheels 75 and 76 which are parallel to the fly wheel and arranged on respective sides of the fly wheel. Each wheel 75, 76 is mounted on an annular bearing 77 which defines an axis 78 offset from the axis of the shaft 71.

The apparatus further includes an inner frame A in the form of a channel member and an outer frame B in the form of a similar channel member arranged outwardly of and receiving the frame A inwardly thereof.

The annular bearings 77 are carried on the inner frame A. The shaft 71 is mounted in bearings 79 on the outer frame B. A screw 80 shown in FIG. 12 allows adjustment of the position of the inner frame relative to the outer frame thus moving the shaft 71 within the open space defined by the inside of the .annular bearing 77.

Figure 11:
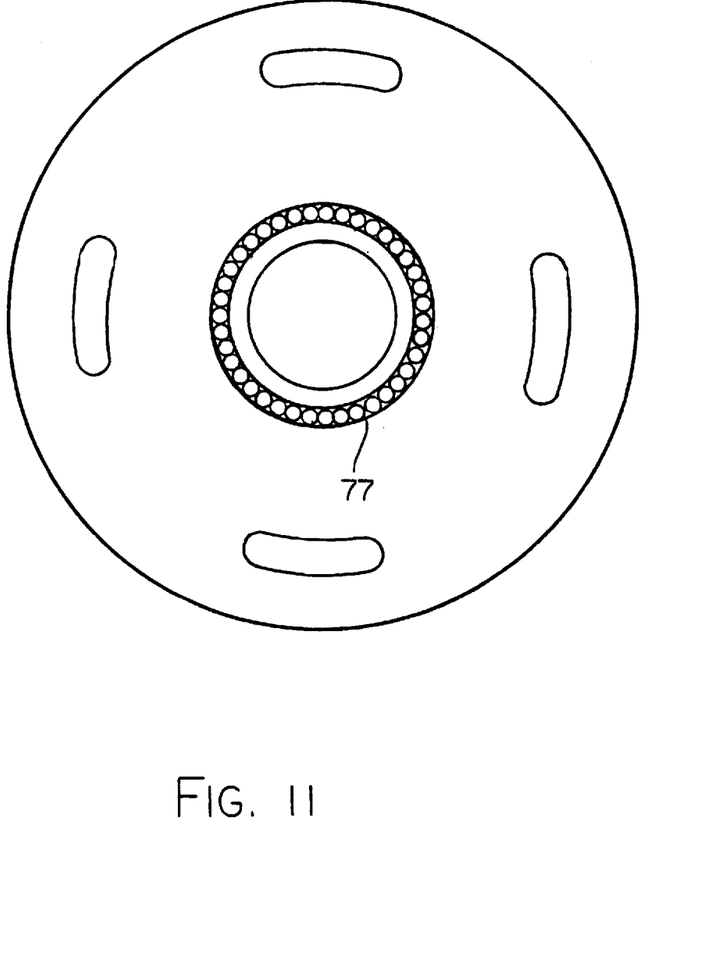
FIG. 11 is a front elevational view of the slotted control wheel.
Figure 12:
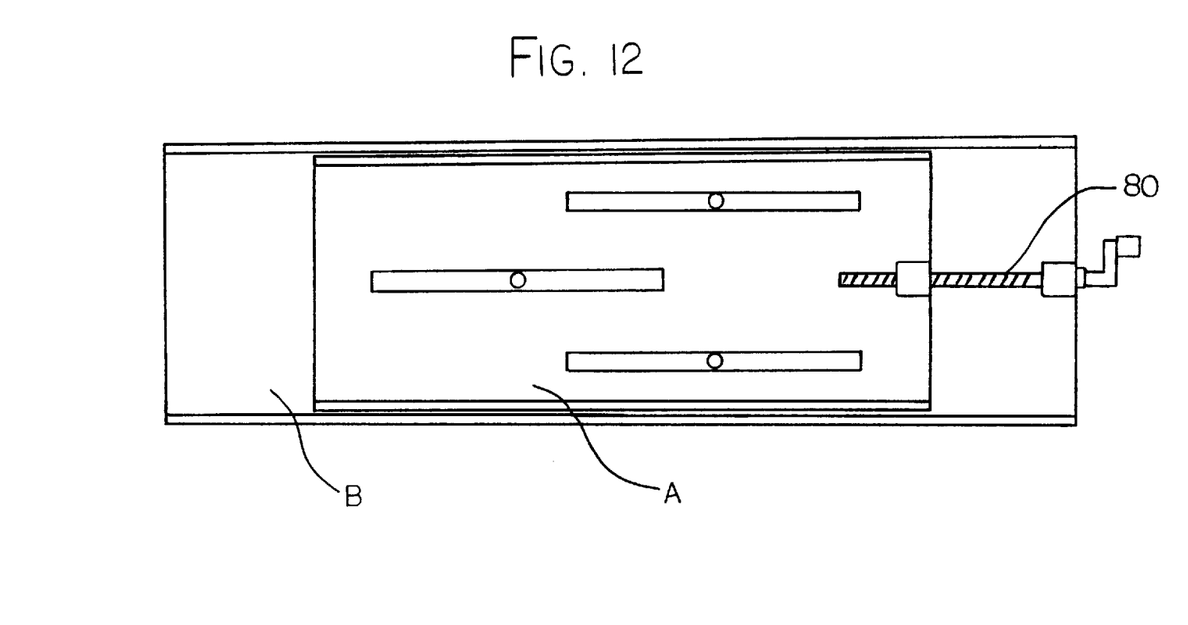

Each of the guide wheels 75 and 76 includes a plurality of slots 81 at angularly spaced positions therearound, the slots lying on a circle surrounding the axis 78 and spaced slightly inwardly from the periphery of the wheel 75, 76. The slots in the wheel 75 and 76 are aligned.

The apparatus further includes a plurality of masses or weights 83 at angularly spaced positions around the fly wheel. Each weight is in the form of a dumbbell with a pair of discs 83A and 83B seperated by a shaft 83C.

In the embodiment shown there are four masses arranged at 90° around the flywheel. The shaft of each mass is slidable within the slot 73 of the flywheel. The shaft of each mass is also slidable within the aligned pair of slots 81 in the guide wheels 75, 76.

In operation, the rotation of the fly wheel causes the masses to rotate around the axis of the fly wheel. At the same time the masses are maintained upon a circle defined by the guide wheels since the shaft of each mass must remain within the slot of the guide wheel and thus the centre of gravity of the mass is maintained at a position surrounding the axis 78. in this way, while the masses move in rotation around the shaft 71, they are moved relative to that shaft by the cooperation with the respective slot of the guide wheel so that, as shown in FIG. 10, the masses are moved to positions of minimum and maximum displacement from the shaft 71 thus generating a force in a direction D lying along a line joining the axis of the shaft and the axis 78. The amount of displacement and thus the amount of the force along the direction of action can be adjusted by moving the inner frame relative to the outer frame and thus moving the axis 78 relative, to the shaft 71. in addition, the angle of the direction of action can be adjusted by moving the axis of the shaft 71 to different positions around the axis 78 with the direction lying on a line joining the-axes.

In order to cancel unwanted sideways forces, two similar devices can be used rotating in opposed directions.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An apparatus for developing a propulsion force in a predetermined direction comprising:

a flywheel;

an axle mounting the flywheel for rotation of the flywheel about a first axis defined by the axle;

a plurality of masses mounted on the flywheel for rotational movement therewith about the first axis and for lateral movement relative to the flywheel in a direction to increase and decrease a distance of a center of gravity of each mass from the first axis;

a mass movement control member rotating about a second axis for controlling movement of the masses as they rotate with the flywheel such that the masses are cyclically moved relative to the flywheel such that the distance from the first axis is at a maximum in said direction and at a minimum in a direction opposite to said direction;

an outer frame supporting the axle and the flywheel mounted thereon;

an inner frame slidably mounted within the outer frame supporting the mass movement control member; and directional control means controlling displacement of the inner frame relative to the outer frame for controlling magnitude of propulsion and the direction of propulsion.

2. The apparatus according to claim 1, wherein the directional control means comprises a screw mounted on the outer frame being threadably connected to the inner frame for displacing the inner frame relative to the outer frame in response to the rotation of the screw.

3. The apparatus according to claim 1 wherein the flywheel is driven by a pulley mounted on an end of the axle for connection to a power source.

4. The apparatus according to claim 1:
wherein the flywheel includes a plurality of elongate slot shaped openings in the flywheel extending radially outwards from a center of the flywheel;
wherein the masses are slidably arranged within the respective slot shaped openings for movement therein;
wherein the control member is arranged generally parallel to and adjacent to the flywheel and is mounted for rotation about the second axis parallel to and offset from the first axis in the direction;
and wherein the control member includes guide slots therein each for cooperating with one of the respective masses, the guide slots extending in a direction which lies on a circle surrounding the second axis.

5. The apparatus according to claim 4 wherein the control member comprises a disk having an annular bearing containing the first axis.

6. The apparatus according to claim 5 wherein the control member comprises a pair of parallel disks, each on a respective side of the flywheel with the slots of one disk aligned with the slots of the other.

7. The apparatus according to claim 6 wherein each mass is dumbbell-shaped with a shaft extending through the aligned slots of the disks.

\* \* \* \* \*